United States Patent [19]

Nakano

[11] Patent Number: 5,062,933
[45] Date of Patent: Nov. 5, 1991

[54] ULTRASONIC MACHINING METHOD

[76] Inventor: Akio Nakano, 14-1, Ichikawaminami 3-chome, Ichikawa-shi, Chiba-ken, Japan

[21] Appl. No.: 430,279

[22] Filed: Oct. 31, 1989

[30] Foreign Application Priority Data

May 19, 1989 [JP] Japan .................. 1-124196

[51] Int. Cl.$^5$ .................. B23H 3/08; B23H 3/10
[52] U.S. Cl. .................. 204/129.46; 204/129.5; 204/129.7
[58] Field of Search .......... 204/129.46, 129.7, 129.75, 204/129.5

[56] References Cited

U.S. PATENT DOCUMENTS 4,125,444 11/1978 Inoue .................. 204/129.46 X
4,512,859 4/1985 Inoue .................. 204/129.46

FOREIGN PATENT DOCUMENTS 0204899 10/1985 Japan .................. 204/129.46

Primary Examiner—Donald R. Valentine
Attorney, Agent, or Firm—Klauber & Jackson

[57] ABSTRACT

An untrasonic machining method which comprises applying an electric current across a workpiece and a tool subject to ultrasonic vibration and ultrasonically vibrating the tool, while supplying an electrolyte to the gap between the workpiece and the tool, said workpiece and tool being positioned a certain distance apart, said electrolyte containing spherical soft abrasive grains suspending therein, said ultrasonic vibration actuating said abrasive grains so that they remove the film formed on the work surface of the workpiece by electrolysis, with the removed film being discharged from said gap during machining. Alternatively, the electrolyte and abrasive grains are supplied separately and mixed in the gap.

3 Claims, 2 Drawing Sheets

ULTRASONIC MACHINING METHOD

BACKGROUND OF THE INVENTION

1. Field of the Invention

The present invention relates to an ultrasonic machining method for mirror-finishing (polishing) a hard workpiece made of boride cermet which has both a hard layer and a comparatively soft metal binding layer.

2. Description of the Prior Art

Ultrasonic machining for polishing is usually accomplished by the impact action of hard abrasive grains placed between a workpiece and a tool attached to a vibrating horn of an ultrasonic machine. The impact action is induced by the ultrasonic vibration of the tool. The abrasive grains, which are made of meta-B$_4$C or CBN, bring about minute brittle fracture in the work surface of the workpiece. In other words, ultrasonic machining resorts on the mechanical removal of material from a workpiece which is achieved by the direct application of mechanical force (machining stress) to a workpiece. Therefore, the machining precision of the finished surface is no better than that achieved in mechanical machining.

In order to improve the accuracy of finishing, there was invented and proposed an ultrasonic machining method which is combined with electrochemical machining. According to this method, an electrolyte containing hard abrasive grains is placed between a workpiece and a tool and an electric current is applied across them for electro-chemical machining. (See Japanese Patent Laid-open No. 282821/1987.)

This new ultrasonic machining combined with electrochemical machining provides a higher accuracy of finishing than the conventional ultrasonic machining. Nevertheless, it still has a disadvantage that it leaves strain in the workpiece because it achieves machining by the impact of hard abrasive grains against the workpiece or by the mechanical force directly applied to the workpiece. Therefore, it is not yet satisfactory for mirror finishing which needs an extremely high precision.

There has recently arisen a demand in the field of die cast mold for the technology which permits mirror finishing with an extremely high precision. The cavity of a die cast mold into which a high-temperature molten metal is injected should have a mirror-finished surface so that it gives a good casting surface and a high dimensional accuracy to the molded product.

SUMMARY OF THE INVENTION

The present invention was completed in view of the above foregoing. Accordingly, it is an object of the present invention to provide an ultrasonic machining method which effectively performs mirror-finishing with an extremely high precision while keeping constant the electrolytic action that removes the material from the workpiece by the aid of an electrolyte.

DETAILED DESCRIPTION OF THE INVENTION

The first aspect of the present invention resides in an ultrasonic machining method which comprises applying an electric current across a workpiece and a tool subject to ultrasonic vibration and ultrasonically vibrating the tool, while supplying an electrolyte to the gap between the workpiece and the tool, said workpiece and tool being positioned a certain distance apart, said electrolyte containing spherical soft abrasive grains suspending therein, said ultrasonic vibration actuating said abrasive grains so that they remove the film formed on the work surface of the workpiece by electrolysis, with the removed film being discharged from said gap during machining.

The second aspect of the present invention resides in an ultrasonic machining method which comprises applying an electric current across a workpiece and a tool subject to ultrasonic vibration and ultrasonically vibrating the tool, while supplying an electrolyte and spherical soft abrasive grains separately to the gap between the workpiece and the tool, said workpiece and tool being positioned a certain distance apart, said spherical soft abrasive grains being capable of suspending in said electrolyte, said ultrasonic vibration actuating said abrasive grains so that they remove the film formed on the work surface of the workpiece by electrolysis, with the removed film being discharged from said gap during machining.

According to the first aspect of the present invention, ultrasonic machining is carried out in the following manner. A workpiece is placed a certain distance away from a tool subject to ultrasonic vibration. The gap between the workpiece and the tool is filled with an electrolyte which is continuously supplied. The electrolyte contains spherical soft abrasive grains suspending therein. Then an electric current is applied across the workpiece and the tool to perform electrochemical machining on the workpiece. At the same time, the tool is ultrasonically vibrated so as to actuate the abrasive grains in the electrolyte. The actuated abrasive grains act upon the surface of the workpiece, mechanically removing the film formed by electrolysis. The removed film scraps are discharged from the gap by the electrolyte which is continuously supplied. As the result, the electrochemical machining proceeds constantly without being hindered by the film formed on the surface of the workpiece. Thus the method of the present invention carries out satisfactory mirror finishing.

According to the second aspect of the present invention, ultrasonic machining is carried out in the similar way to that mentioned above, except that an electrolyte and spherical soft abrasive grains are separately supplied to the gap between a workpiece and a tool subject to ultrasonic vibration, and they are mixed in the gap.

EXAMPLES

Figure 1:
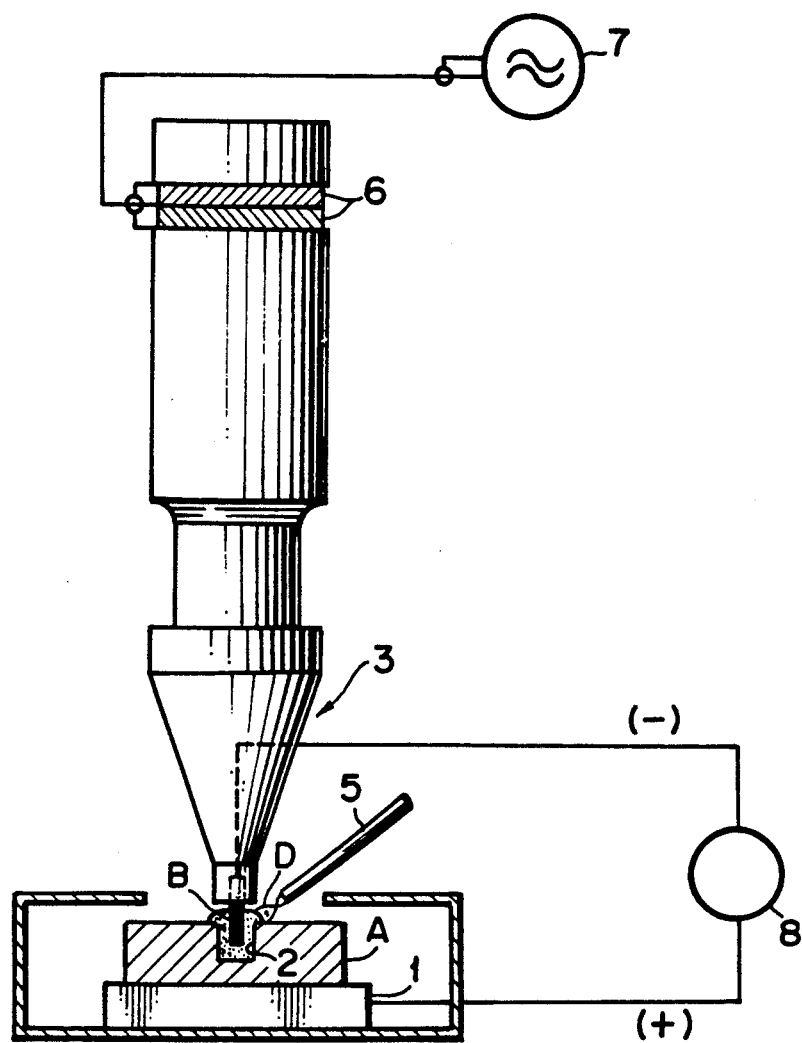
FIG. 1 is a schematic drawing illustrating a first embodiment of the ultrasonic machining method pertaining to the present invention.

The invention will be described in more detail with reference to an example (pertaining to the first aspect of the invention) as illustrated in FIG. 1. There is shown the workpiece (A) which is made of boride cermet such as MoB-Ni-Mo. The workpiece (A) is placed on the table (1) of an ultrasonic machine. The tool (B) attached to the vibrating horn (3) of the ultrasonic machine is positioned a certain distance away from the work surface (2) of the workpiece (A). To the gap between the tool (B) and the work surface (2) is supplied the electrolyte (D) which contains the spherical soft abrasive grains (C). An electric current is applied across the gap to carry out electrochemical machining, thereby removing the material from the work surface (2) of the workpiece (A). The film (4) formed on the work surface (2) by electrolysis is scraped off as the spherical soft abrasive grains (C) being actuated by the tool (B) impinge upon the work surface (2). The scraps of the film (4) which have been scraped off are discharged from the gap by the electrolyte (D) which is supplied continuously. In this way, the work surface (2) of the workpiece (A) undergoes mirror finishing.

The spherical soft abrasive grains (C) have the same specific gravity as that of the electrolyte (D) so that they suspend in the electrolyte (D). They are so charged as to catch insoluble matter such as the film (4) formed by electrolysis. They are soft enough not to cause damage or strain to the work surface (2) of the workpiece (A) when they come into contact with it. They are made up of a core and a coating layer. The core is made spherical from a polymeric material such as polyamide MXD6 (m-xylylenediamine MXDA+adipic acid), and the coating layer is formed by sputtering or EB deposition from Mo-Ni-Co or Nd-Fe-B which has a potential equal to or slightly higher than that of the workpiece (A). The abrasive grains have a particle diameter of about 1 $\mu$m.

The spherical soft abrasive grains (C) have a specific gravity which is established according to the concentration of the electrolyte (D), so that they suspend in the electrolyte (D). Also, they may be charged as much as necessary according to the material and physical properties (such as electrical conductivity) of the workpiece (A).

The electrolyte (D) in which the spherical soft abrasive grains (C) are suspended is composed of 1 part of 60% perchloric acid ($HClO_4$), 10 parts of 100% methanol ($CH_3OH$), and 6 parts of butyl cellosolve (ethylene glycol monobutyl ether $CH_3(CH_2)_2CH_2OCH_2CH_2OH$). The electrolyte (D) is supplied to the gap between the tool (B) and the work surface (2) of the workpiece (A) from the electrolyte supply port (5) connected to storage tank through a supply pump (both not shown).

The ultrasonic machine used in this example has the piezoelectric transducer (6) connected to the oscillator (7). The former produces amplitudes of $21\pm1.5$ $\mu$m at high frequencies of $15\sim30\pm5$ kHz and amplitudes of $24\pm2$ $\mu$m at low frequencies of $2\sim15\pm18$ kHz. The ultrasonic machine is capable of generating ultrasonic vibration over a broad range of frequencies. The electrolyte (D) reacts with the work surface (2) of the workpiece (A) in such a manner that the film (4) is constantly formed by electrolysis on the work surface (2) of the workpiece (A). The electric current for electrolysis is applied across the work surface (2) and the tool (B) by the current generator (8) connected to the tool (B), which functions as an anode (+), and the table (1), which functions as a cathode (−).

The ultrasonic machining in this example is carried out in the following manner. The workpiece (A) which has been roughed by electric discharge machining is placed on the table (1) of the ultrasonic machine. The tool (B) of the ultrasonic machine is positioned a certain distance away from the work surface (2) of the roughed workpiece (A). To the gap between the tool (B) and the work surface (2) is supplied the electrolyte (D) containing the spherical soft abrasive grains (C). The current generator (8) is started to apply an electric current across the gap and, at the same time, the tool (B) is ultrasonically vibrated by the vibrating horn (3).

Figure 2:
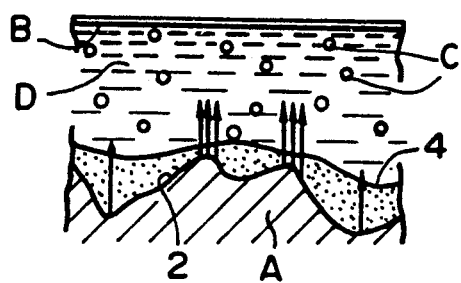
FIG. 2 is a partly enlarged view of FIG. 1.

Thus the work surface (2) of the roughed workpiece (A) undergoes electrochemical machining. The film (4) formed on the work surface (2) by electrolysis is scraped off by the spherical soft abrasive grains (C) which are impinged upon the film (4) by the vertical vibration of the tool (B). The scraping takes place preferentially at the projecting parts of the film (as shown in FIG. 2), because the spherical abrasive grains (C) suspend in the electrolyte (D) and the vertical amplitude of the tool (B) is adjustable over a broad range of ultrasonic frequencies. The scraped scraps of the film (4) are discharged from the gap between the work surface (2) and the tool (B) by the flow of the electrolyte (D).

According to the machining method of this example, the mirror finishing of the work surface (2) of the workpiece (A) is accomplished mainly by the electrochemical machining which proceeds at a constant rate because the film (4) formed on the work surface (2) of the workpiece (A) by electrolysis is continuously removed by ultrasonic machining. Thus the ultrasonic machining method of the present invention permits mirror-finishing with an extremely high precision and improves the machining efficiency.

The machining in this example was carried out under the following conditions.

a. Material of the workpiece: MoB-Ni-Mo
b. Area of machining (electropolishing): 20 cm$^2$
c. Voltage for electrolysis: 56 V
d. Current for electrolysis: 20 A
e. Flow rate of electrolyte: 500 mL/min, at 17° C.
f. Ultrasonic frequency for abrasive grains (max): 21.5 kHz
g. Gap: 50 $\mu$m
h. Content of abrasive grains in electrolyte: 17%

The ultrasonic machining mentioned above achieved mirror finishing with a high surface precision of 0.1 $\mu$m/4 mm in a machining time of 30 seconds, as noted in the accompanying chart.

To achieve the best result, changes were made with time in the conditions of the ultrasonic machining, such as the content of abrasive grains (C) in the electrolyte, the frequency and amplitude of the tool (B), and the gap between the tool (B) and the work surface (2) of the workpiece (A), as shown in the chart.

Figure 3:
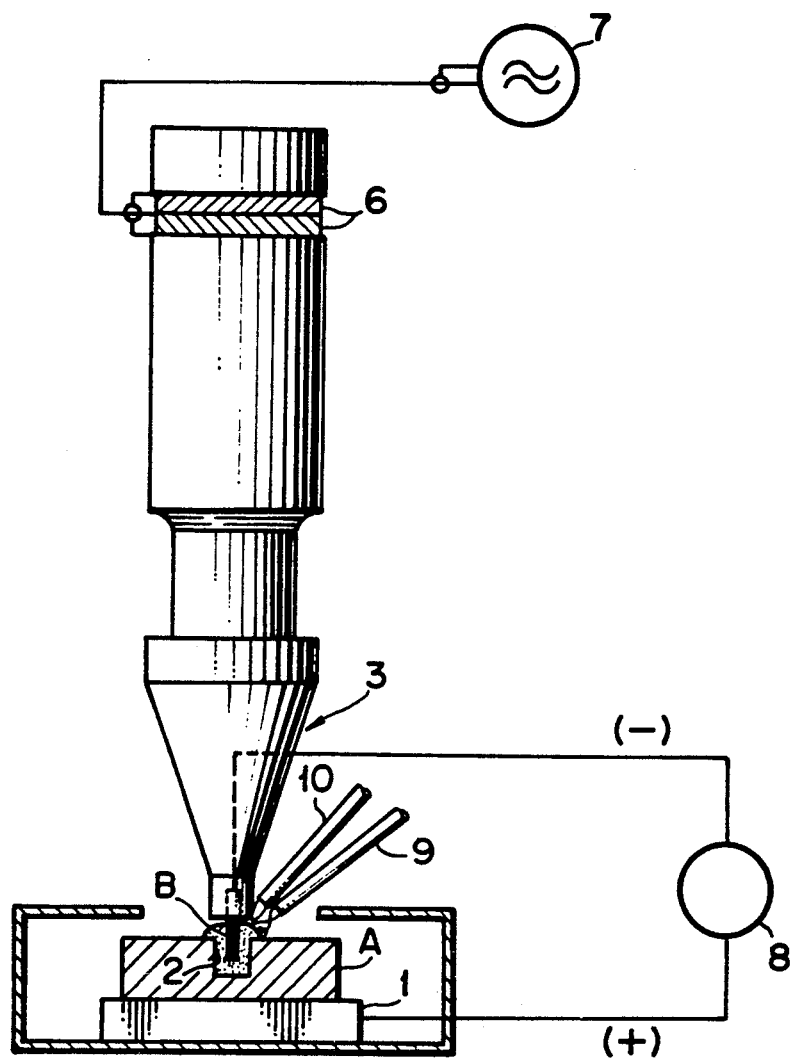
FIG. 3 is a schematic drawing illustrating a second embodiment of the ultrasonic machining method pertaining to the present invention.

FIG. 3 shows an embodiment pertaining to the second aspect of the present invention. The fundamental constitution of this embodiment is the same as that of the above-mentioned embodiment pertaining to the first aspect of the present invention. In FIGS. 1 and 3, like reference characters designate like or corresponding parts. In FIG. 3, there is shown an electrolyte supply port (9) through which to supply the electrolyte (D) to the gap between the tool (B) and the work surface (2) of the workpiece (A), and there is also shown an abrasive grain supply port (10) through which to supply spherical soft abrasive grains (C) to the gap so that they are mixed into the electrolyte (D).

The electrolyte supply port (9) is connected by a pipe to a storage tank through a supply pump as mentioned above, and the abrasive grain supply port (10) is connected to a storage hopper (not shown) through an adequate transfer means such as a fan.

According to this second embodiment, ultrasonic machining is carried out in the following manner. The electrolyte (D) is supplied to the gap between the tool (B) and the work surface (2) of the workpiece (A). At the same time, the spherical soft abrasive grains (C) are also supplied to the gap through the abrasive grain supply port (10), so that the abrasive grains (C) are dispersed into the electrolyte (D). The work surface (2) of the workpiece (A) is mirror-finished mainly by electrochemical machining. The film (4) formed on the surface (2) of the workpiece (A) by electrolysis is scraped off by ultrasonic machining. Therefore, the electrochemical machining proceeds at a constant rate without being hindered by the film (4). Thus, mirror finishing with an extremely high precision can be achieved efficiently.

According to this embodiment, the electrolyte (D) and the abrasive grains (C) are supplied separately to the gap between the tool (B) and the work surface (2) of the workpiece (A). This constitution offers an advantage that it is possible to easily switch one kind of abrasive grains to a differently charged one in compliance with the electrical conductivity and other properties of the workpiece (A). In addition, this constitution permits the abrasive grains (C) to be added to the electrolyte (D) in any desired ratio.

In this embodiment, the electrode supply port (9) and the abrasive grain supply port (10) are arranged separately; however, this embodiment may be modified such that the two supply ports (9) and (10) may be integrated into one port from which the electrolyte and abrasive grains are supplied in the mixed form.

The ultrasonic machining method of the present invention produces the following functions and effects owing to the above-mentioned constitution.

(1) Machining is carried out while an electrolyte containing spherical soft abrasive grains suspending therein is being supplied to the gap between the workpiece and the tool subject to ultrasonic vibration which are positioned a certain distance apart. And machining resorts mainly to electrolysis induced by an electric current applied across the workpiece and the tool. The spherical abrasive grains, which are ultrasonically actuated in the electrolyte, scrape off the film formed on the work surface of the workpiece by electrolysis. The scraped scraps of the film are discharged from the gap by the flow of the continuously supplied electrolyte.

This machining method is designed to perform the electrochemical machining which removes the material from the surface of the workpiece, while removing the film formed by electrolysis and preventing the hindrance by the film, so that the electrochemical machining proceeds at a constant rate. Therefore, this machining method permits efficient mirror finishing with an extremely high precision.

(2) Machining is carried out while electrolyte and spherical abrasive grains are being supplied separately to the gap between the workpiece and the tool subject to ultrasonic vibration which are positioned a certain distance apart. Therefore, this machining method offers the same functions and effects as mentioned above (1), and this machining method offers an additional advantage that it is possible to easily switch one kind of abrasive grain to a differently charged one in compliance with the electrical conductivity and other properties of the workpiece. In addition, the separate supply system permits the abrasive grains to be added to the electrolyte in any desired ratio.

What is claimed is:

1. An ultrasonic machining method, comprising the steps of:
    arranging a tool adjacent to a workpiece having a work surface, with a gap of a predetermined distance between said work surface and said tool;
    supplying an electrolyte having spherical soft abrasive grains suspended therein, to the gap between the work surface and the tool;
    applying an electric current across the workpiece and the tool; and
    ultrasonically vibrating said tool such that said grains are ultrasonically vibrated and such that the grains remove a film formed on the work surface of the workpiece by electrolysis, with the removed film being discharged from said gap during machining.

2. The method of claim 1, wherein said step of supplying the electrolyte having said grains suspended therein includes the step of separately supplying said electrolyte and said grains to said gap.

3. The method of claim 1, wherein said grains have a diameter of approximately 1 $\mu$m.

* * * * *